F. HARRINGTON.
EXTENSION PEDAL ATTACHMENT.
APPLICATION FILED MAR. 10, 1914.
1,128,975.
Patented Feb. 16, 1915.
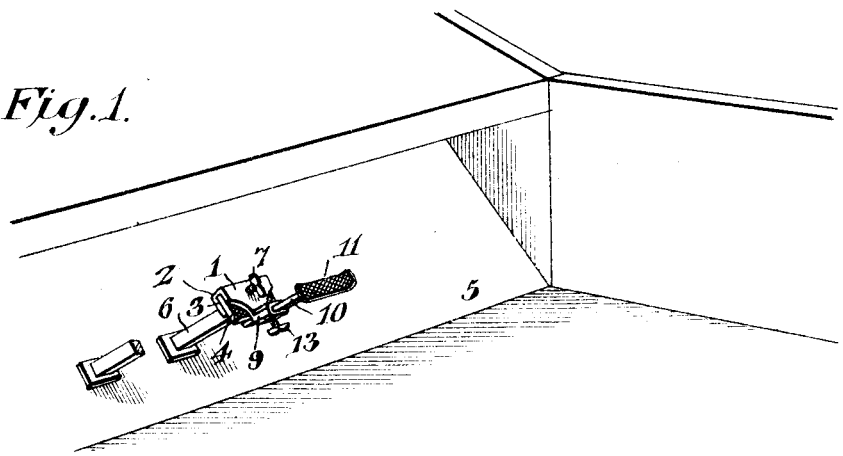
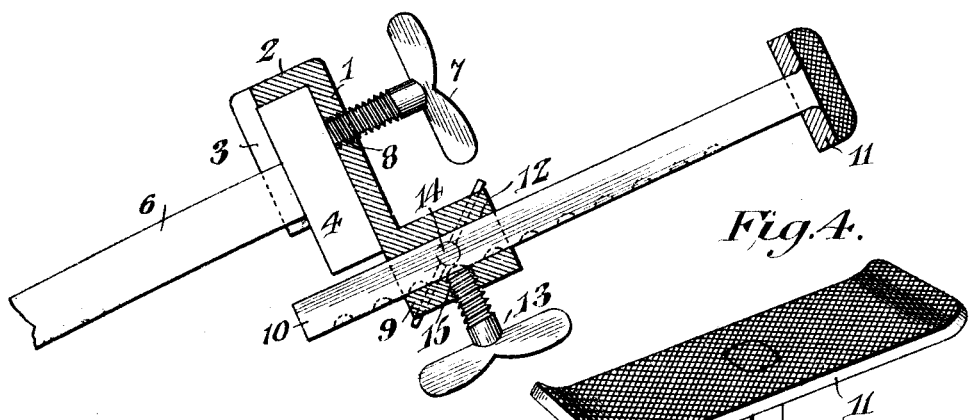
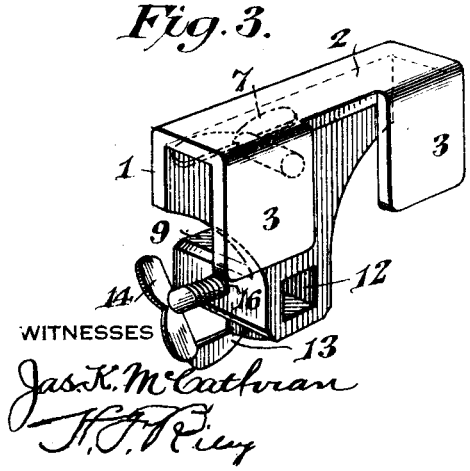
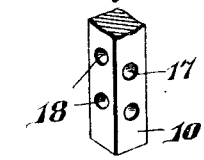
F. Harrington, INVENTOR

UNITED STATES PATENT OFFICE.

FRED HARRINGTON, OF WICHITA FALLS, TEXAS.

EXTENSION PEDAL ATTACHMENT.

1,128,975. Specification of Letters Patent. Patented Feb. 16, 1915.

Application filed March 10, 1914. Serial No. 823,741.

*To all whom it may concern:*

Be it known that I, FRED HARRINGTON, a citizen of the United States, residing at Wichita Falls, in the county of Wichita and State of Texas, have invented a new and useful Extension Pedal Attachment, of which the following is a specification.

The invention relates to an extension pedal for automobiles.

The object of the present invention is to provide a simple, strong, and inexpensive device adapted to be readily applied to any ordinary pedal of an automobile and capable of easy and quick adjustment to vary the length of such operating element.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a perspective view of an extension pedal attachment constructed in accordance with this invention, as shown applied to an automobile pedal. Fig. 2 is an enlarged longitudinal sectional view of the same. Fig. 3 is a perspective view of the supporting bracket. Fig. 4 is a similar view of the adjustable pedal.

Like numerals of reference designate corresponding parts in all the figures of the drawing.

In the accompanying drawing, in which is illustrated the preferred embodiment of the invention, the extension pedal attachment comprises, in its construction, a supporting bracket consisting of a front plate 1, preferably tapered downwardly, as shown, and provided at the top with a supporting flange 2 and having spaced depending engaging portions or arms 3 extending downwardly from the rear edge of the flange 2 in parallelism with the front plate 1. The top flange 2 is arranged in a plane at right angles to the plane of the front plate, and the spaced depending arms or portions 3 form, with the said top flange, a pair of hooks adapted to engage over the upper edge of the pedal 4 of an automobile 5. The front plate 1 is adapted to fit against the upper or front face of the pedal 4, and the flange 2 is arranged upon the upper edge thereof, while the depending arms or portions 3 are located at the rear face of the pedal 4 at opposite sides of the shank or stem 6. The bracket is firmly clamped on the pedal 4 by a thumb screw 7 mounted in a threaded perforation 8 of the front plate, and engaging the front face of the pedal 4. By turning the thumb screw 7 the attachment may be readily applied to and removed from the automobile pedal 4.

The bracket or hanger, which may be constructed of any suitable metal, is provided at the bottom with a sleeve 9 located below the plane of the automobile pedal 4 and receiving a shank or bar 10 of an adjustable pedal or foot plate 11. The adjustable shank or stem 10 is preferably square in cross section, and the sleeve 9 has a rectangular opening 12 to conform to the configuration of the adjustable shank or stem, and the latter is secured in its adjustment by bottom and side thumb screws 13 and 14 mounted in threaded perforations 15 and 16 in the bottom and side of the sleeve and adapted to engage indentations 17 and 18 formed in the bottom face and in one of the side faces of the adjustable shank or stem 10. The indentations, which consist of concavities, are staggered, the indentations 17 of the bottom being located opposite the intervals or spaces between the indentations 18 of the side of the adjustable shank or stem. By this staggered arrangement an increased range of adjustment is attained, and the clamping screws 13 and 14 have tapered engaging ends to fit the indentations 17 and 18. The adjustable shank or stem 10, by being located below the plane of the pedal 4, is adapted to be moved inwardly and outwardly without the pedal 4 interfering with the adjustment of the attachment, and when the adjustable pedal 11 is near the inner limit of its adjustment, the adjustable shank or stem 10 is located below the shank or stem 6 of the automobile pedal. The adjustable pedal 11 is supported at an inclination in a plane in parallelism with the inclined plane of the automobile pedal 4, and it is movable backwardly and forwardly in overlapping relation with the same.

What is claimed is:

1. In combination with an automobile pedal having a stem, a bracket in the form of a hook adapted to hook over the top of the pedal, means for securing the bracket to the pedal, said bracket having a sleeve offset therefrom and depending below the plane of the pedal, an adjustable pedal having a shank passed through the sleeve and extending below the said stem, and means for adjustably connecting the shank and the sleeve, whereby the adjustable pedal and shank are arranged in substantial parallelism with the stem and pedal of the automobile within the limits of the adjustment.

2. In combination with an automobile pedal having a stem, an extension pedal attachment including an adjustable pedal having a shank or bar located below the automobile pedal and movable backwardly and forwardly in parallelism therewith and in overlapping relation with the same, a hanger or bracket having an opening receiving the shank or bar of the adjustable pedal, said hanger or bracket projecting from the upper side of the said shank or bar and provided at the top with spaced approximately hook-shaped portions engaging over the automobile pedal at opposite sides of the stem of the same, and means for securing the adjustable pedal in the opening of the hanger or bracket.

3. An extension pedal attachment for automobiles including an adjustable pedal having a shank or stem, a hanger or bracket consisting of a sleeve slidably receiving the shank or stem and a plate rigid with the sleeve and projecting from one side of the shank or stem and provided at the outer end with spaced hook-shaped portions for engaging an automobile pedal, whereby the adjustable pedal is connected with the automobile pedal and is movable backwardly and forwardly in parallelism therewith and in overlapping relation with the same, and means for securing the adjustable pedal in its adjustment.

4. An extension pedal attachment for automobiles including an adjustable pedal having a shank or stem, a bracket or hanger consisting of a sleeve slidably receiving the said shank or stem and a plate rigid with the sleeve and projecting from the upper side of the shank or stem and provided at the top with a supporting flange to rest upon an automobile pedal and having spaced rear depending arms to engage the automobile pedal at the back thereof, said hanger or bracket supporting the adjustable pedal in substantial parallelism with the automobile pedal and permitting the former to be moved backwardly and forwardly in overlapping relation with the latter, and means for securing the adjustable pedal in its adjustment.

In testimony, that I claim the foregoing as my own, I have hereto affixed my signature in the presence of two witnesses.

FRED HARRINGTON.

Witnesses:
H. L. HUNTER,
FRED LEHMANN, Jr.